(12) United States Patent
Lefebvre et al.

(10) Patent No.: US 11,261,547 B2
(45) Date of Patent: Mar. 1, 2022

(54) REINFORCING FIBER STRUCTURE FOR COMPOSITE MATERIAL PARTS WITH GREAT VARIATION OF THICKNESS

(71) Applicants: SAFRAN CERAMICS, Le Haillan (FR); SAFRAN, Paris (FR)

(72) Inventors: Marie Lefebvre, Merignac (FR); Dominique Coupe, Saint Fargeau-ponthierry (FR); François Charleux, Bordeaux (FR)

(73) Assignees: SAFRAN CERAMICS, Le Haillan (FR); SAFRAN, Paris (FR)

( * ) Notice: Subject to any disclaimer, the term of this patent is extended or adjusted under 35 U.S.C. 154(b) by 105 days.

(21) Appl. No.: 15/551,441

(22) PCT Filed: Feb. 9, 2016

(86) PCT No.: PCT/FR2016/050286
§ 371 (c)(1),
(2) Date: Aug. 16, 2017

(87) PCT Pub. No.: WO2016/132045
PCT Pub. Date: Aug. 25, 2016

(65) Prior Publication Data
US 2018/0038021 A1 Feb. 8, 2018

(30) Foreign Application Priority Data
Feb. 16, 2015 (FR) ...................................... 1551247

(51) Int. Cl.
*D03D 25/00* (2006.01)
*D03D 15/43* (2021.01)
*D03D 11/00* (2006.01)

(52) U.S. Cl.
CPC ............. *D03D 11/00* (2013.01); *D03D 15/43* (2021.01); *D03D 25/005* (2013.01);
(Continued)

(58) Field of Classification Search
CPC .. D03D 11/00; D03D 15/0094; D03D 25/005; D03D 41/004; D03D 5/0094;
(Continued)

(56) References Cited

U.S. PATENT DOCUMENTS

| 7,101,154 B2 | 9/2006 | Dambrine et al. |
| 7,241,112 B2 | 7/2007 | Dambrine et al. |

(Continued)

FOREIGN PATENT DOCUMENTS

| GB | 333279 A | * | 8/1930 | ............. D03D 11/00 |
| WO | WO 2010/061140 A1 | | 6/2010 | |

OTHER PUBLICATIONS

Kumar, R. Senthil. (2014). Textiles for Industrial Applications—2. 3.5.1 Types of Braided Structures. Taylor & Francis. Retrieved from https://app.knovel.com/hotlink/pdf/id:kt00TSZ661/textiles-industrial-applications/types-braided-structures (Year: 2014).*

(Continued)

*Primary Examiner* — Larissa Rowe Emrich
(74) *Attorney, Agent, or Firm* — Pilsbury Winthrop Shaw Pittman LLP

(57) ABSTRACT

A fiber structure includes a plurality of weft layers and a plurality of warp layers interlinked with three-dimensional or multilayer weaving, the fiber structure including at least first and second portions that are adjacent in the warp direction, the first portion presenting thickness in a direction perpendicular to the warp and weft directions that is greater than the thickness of the second portion. The weft layers situated in the core of the first portion of the fiber structure include braids. The weft layers extending on either side of the weft layers including the braids and going as far as the skin of the first portion include yarns or strands, the braids presenting a section greater than the section of the yarns or strands.

13 Claims, 14 Drawing Sheets

(52) U.S. Cl.
CPC ...... *D10B 2101/08* (2013.01); *D10B 2101/12* (2013.01); *D10B 2101/16* (2013.01); *D10B 2101/20* (2013.01); *D10B 2505/02* (2013.01)

(58) Field of Classification Search
CPC ...... D03D 15/04; D04D 7/04; D10B 2101/08; D10B 2101/12; D10B 2101/16; D10B 2101/20; D10B 2403/033; D10B 2505/02; D10B 403/02412; D04H 1/005; D06M 23/14; Y10T 442/3179; Y10T 442/3187; Y10T 442/3195; Y10T 442/3203; Y10T 442/3211; Y10T 442/322; Y10T 442/442; Y10T 442/3228; Y10T 442/3236; Y10T 442/3244; Y10T 442/3252; Y10T 442/326; Y10T 442/3268; Y10T 442/3276; Y10T 442/3285; B29L 2031/085; B29L 2031/7504; B29D 99/0025–0028; F05B 2240/21; Y02P 70/523; Y02E 10/72; Y02E 10/74; B29C 61/0658; B29C 70/22; B29C 70/222; D04C 1/06; D04C 1/00; F01D 5/14; F01D 5/147; F01D 5/282
USPC .............. 428/37; 442/203–216; 139/408–415
See application file for complete search history.

(56) References Cited

U.S. PATENT DOCUMENTS

| | | | |
|---|---|---|---|
| 2005/0084377 A1* | 4/2005 | Dambrine | B29C 70/48 |
| | | | 416/223 R |
| 2011/0110787 A1 | 5/2011 | Belmonte et al. | |
| 2011/0277869 A1* | 11/2011 | Coupe | D03D 25/005 |
| | | | 139/11 |
| 2011/0311368 A1 | 12/2011 | Coupe et al. | |
| 2012/0051935 A1* | 3/2012 | Naik | F01D 5/147 |
| | | | 416/230 |
| 2012/0055609 A1* | 3/2012 | Blanchard | B29C 70/24 |
| | | | 156/89.11 |
| 2012/0308817 A1 | 12/2012 | Ponsolle et al. | |
| 2014/0161626 A1 | 6/2014 | Podgorski et al. | |
| 2016/0032939 A1* | 2/2016 | Anderson | B29C 70/34 |
| | | | 416/230 |

OTHER PUBLICATIONS

"Count." Complete Textile Glossary. New York, NY: Celanese Acetate, 2001. N. pag. Print. (Year: 2001).*

International Search Report as issued in International Patent Application No. PCT/FR2016/050286, dated May 20, 2016.

* cited by examiner

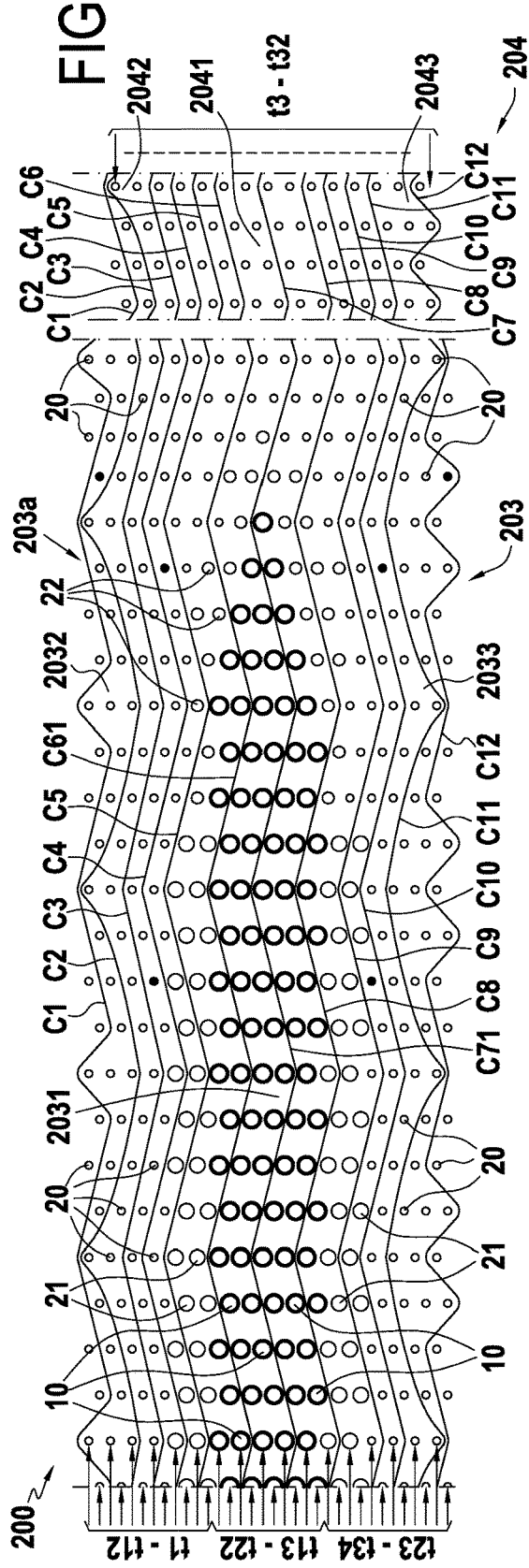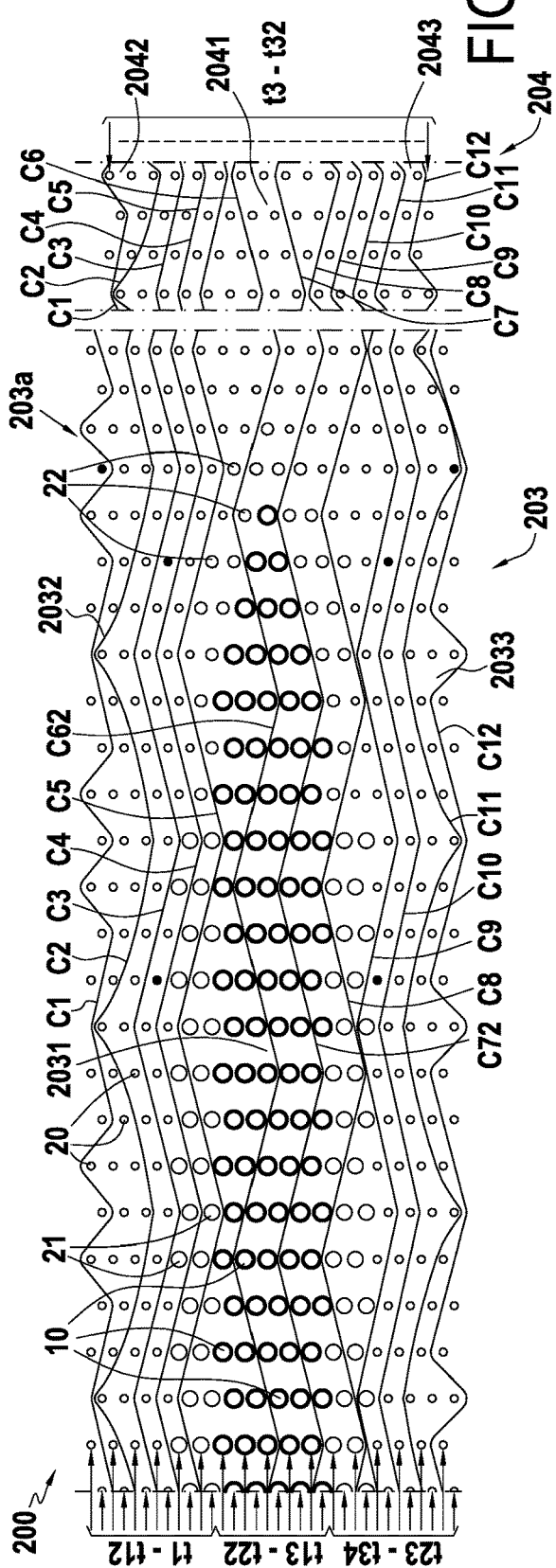

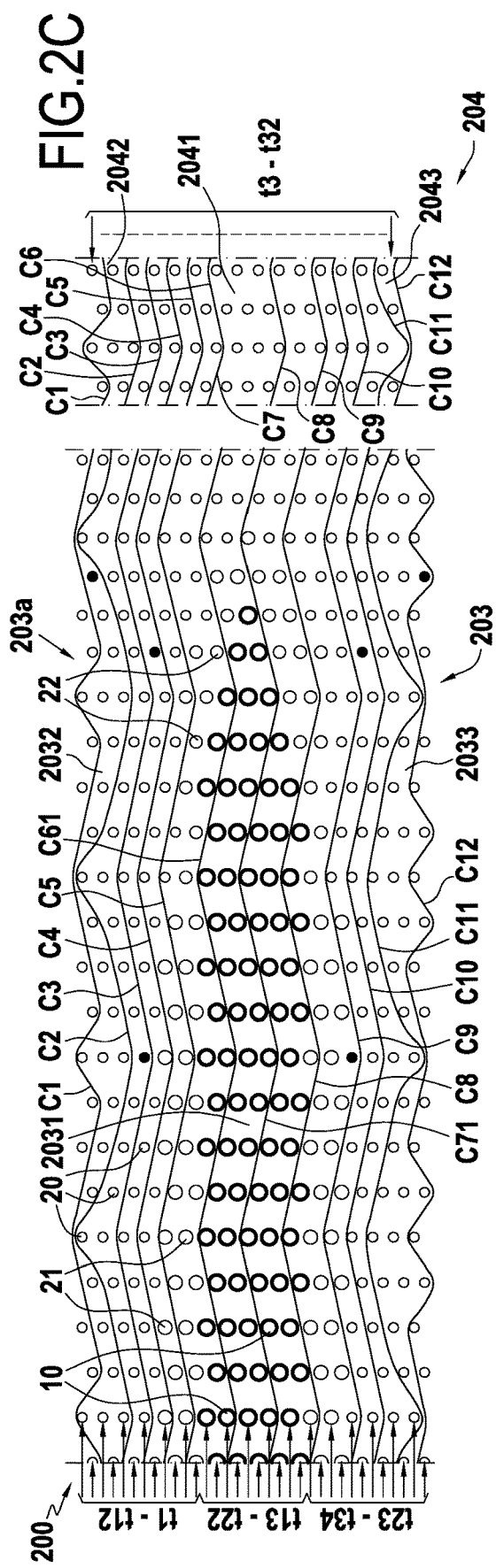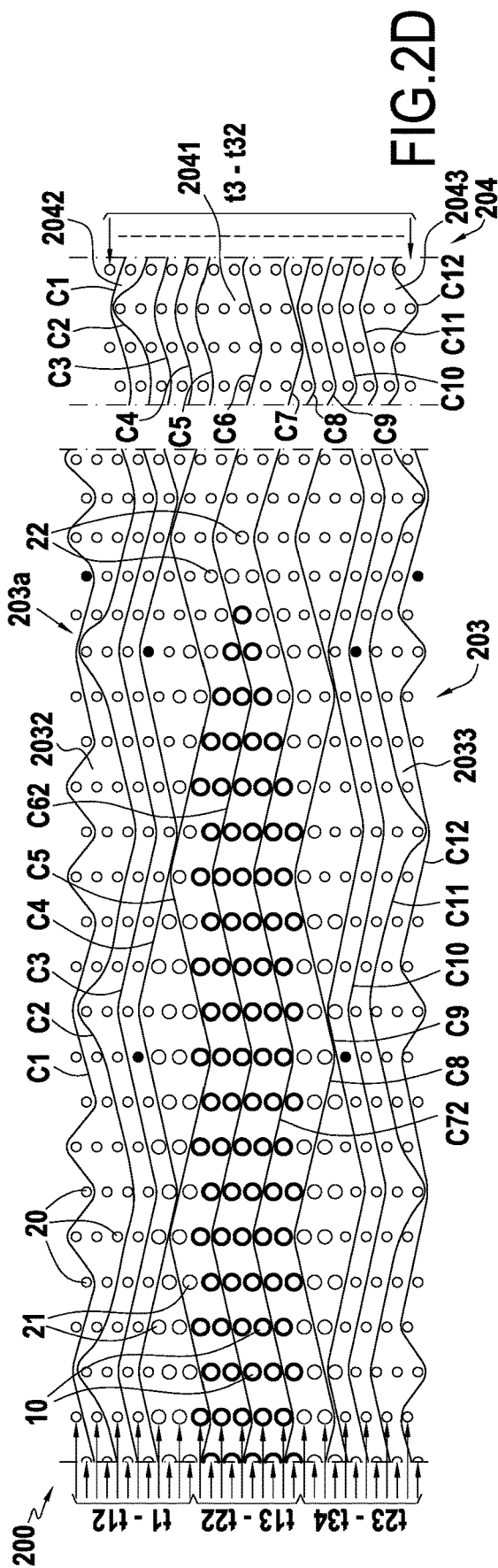

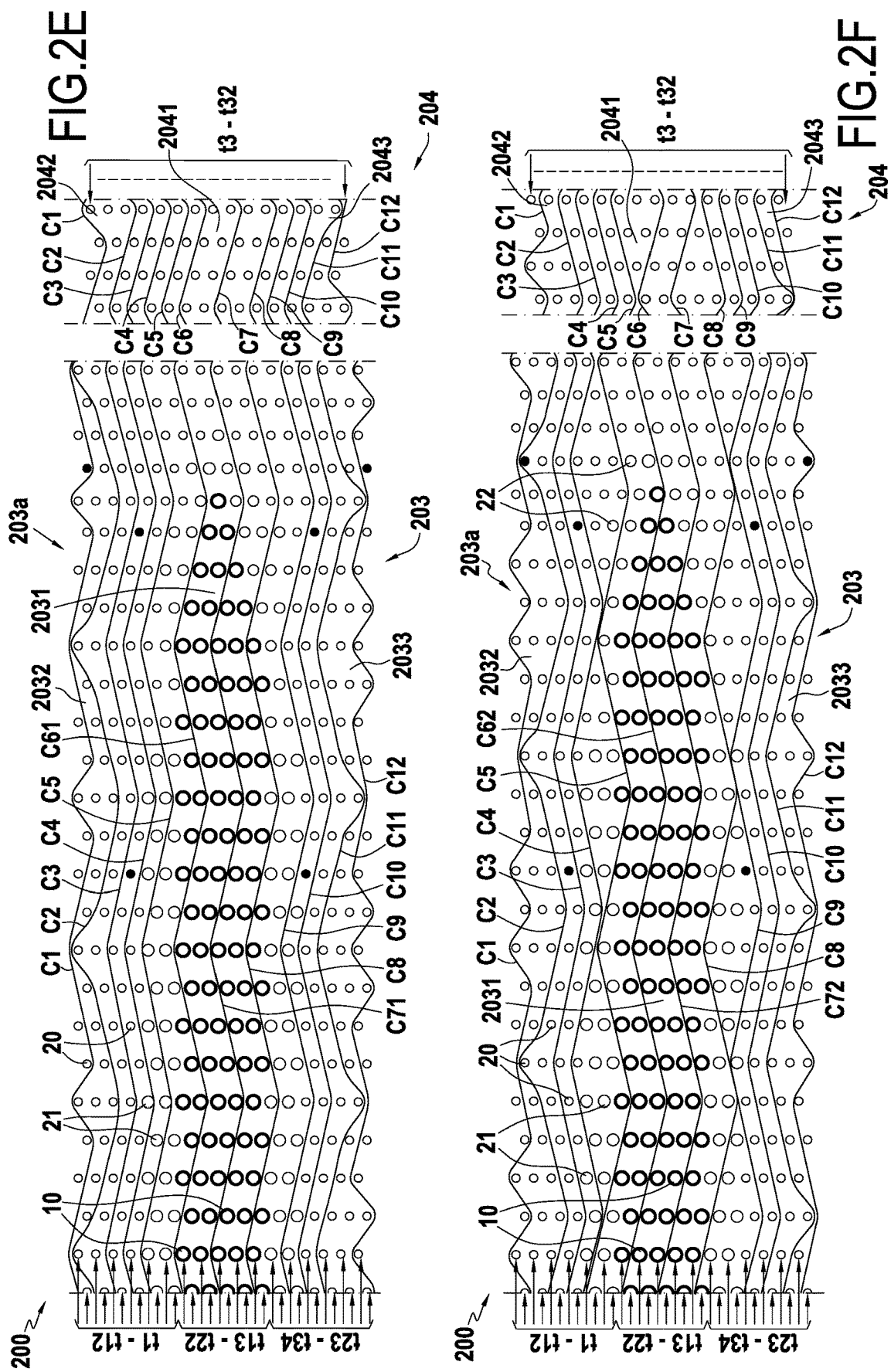

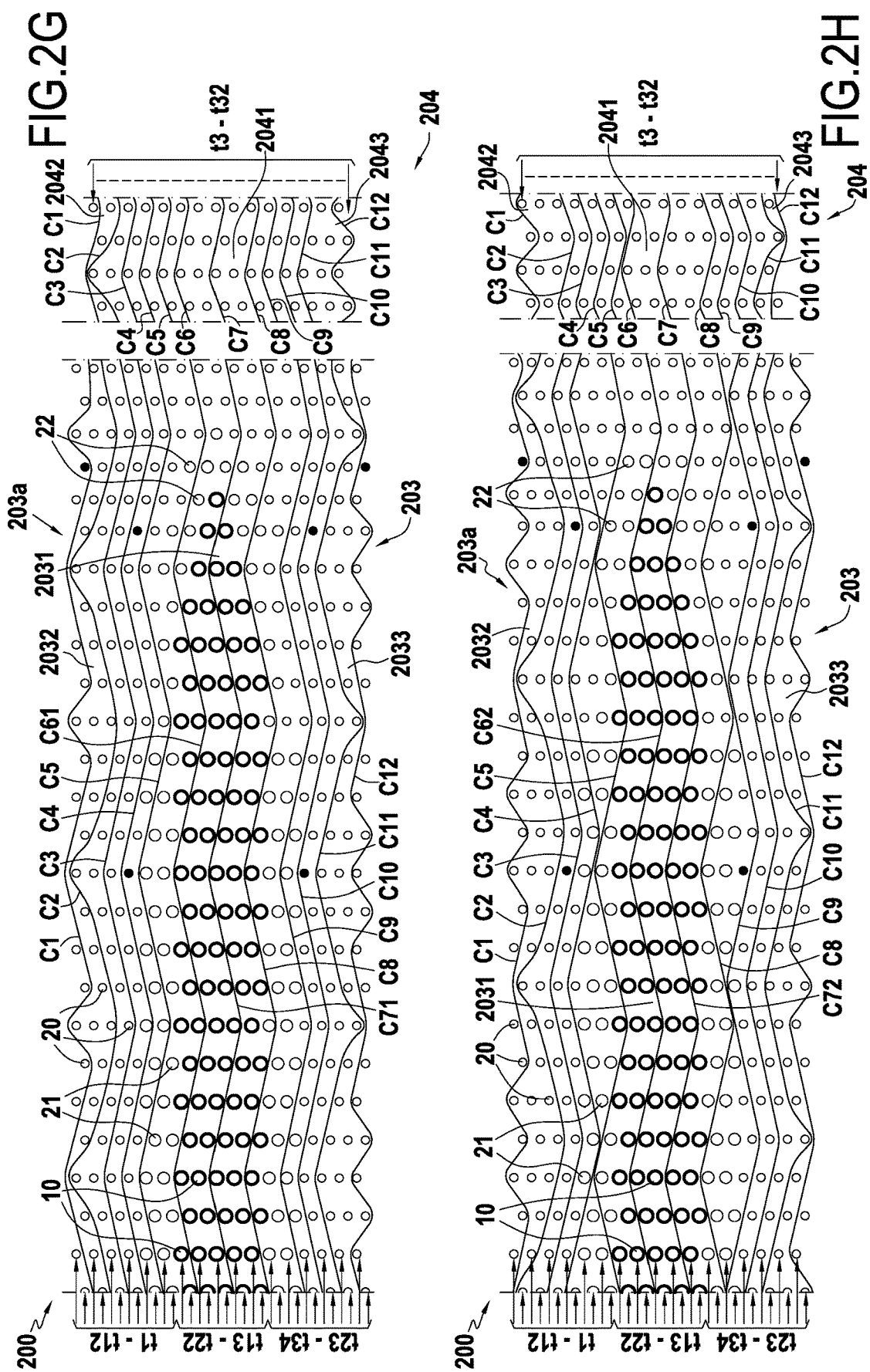

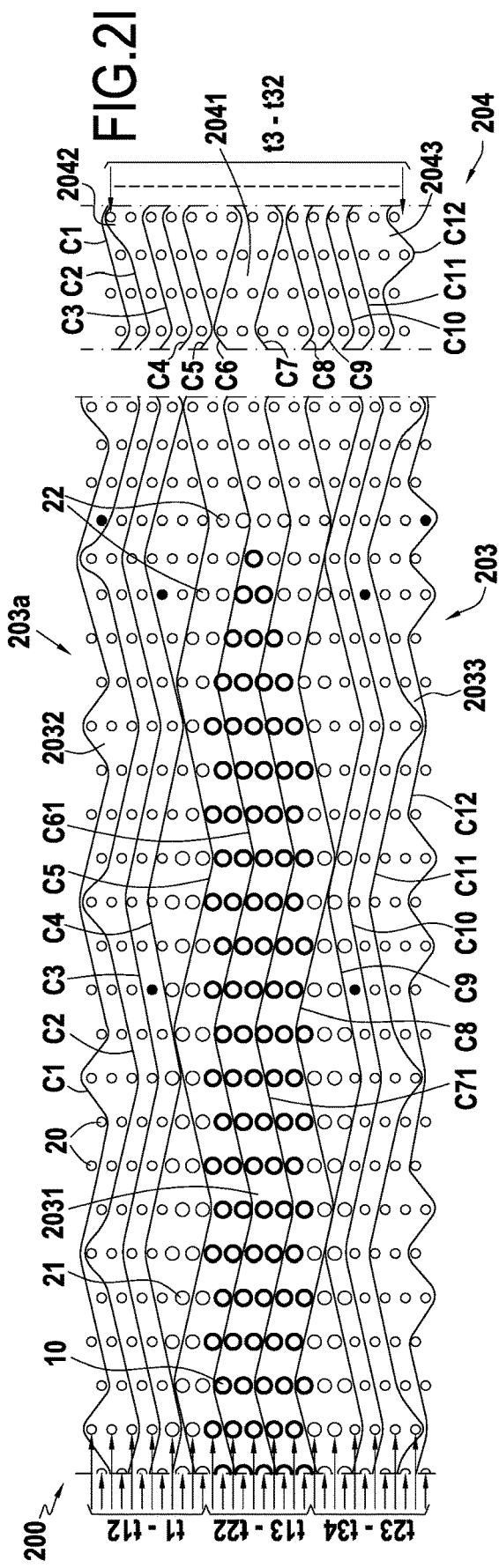

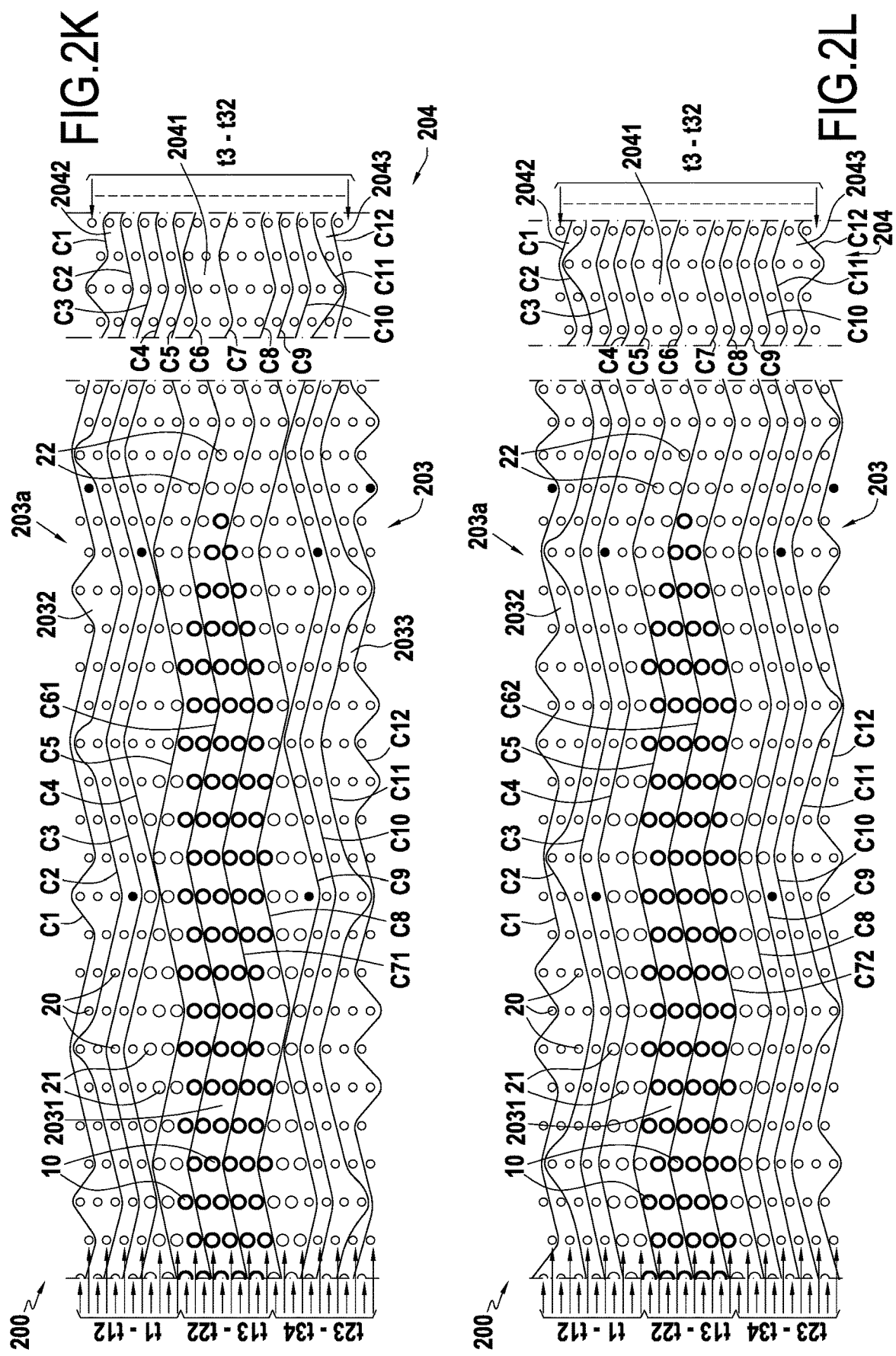

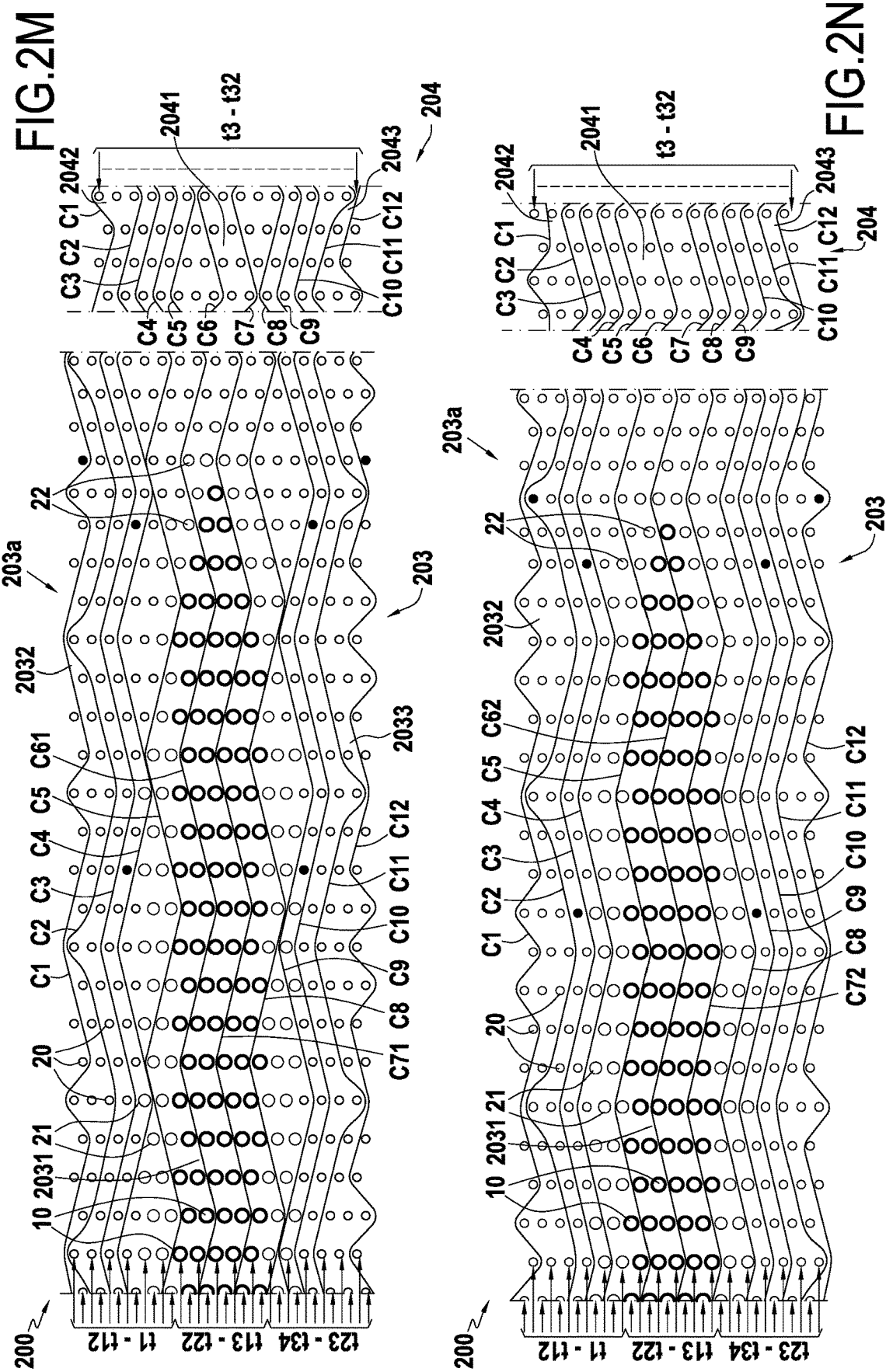

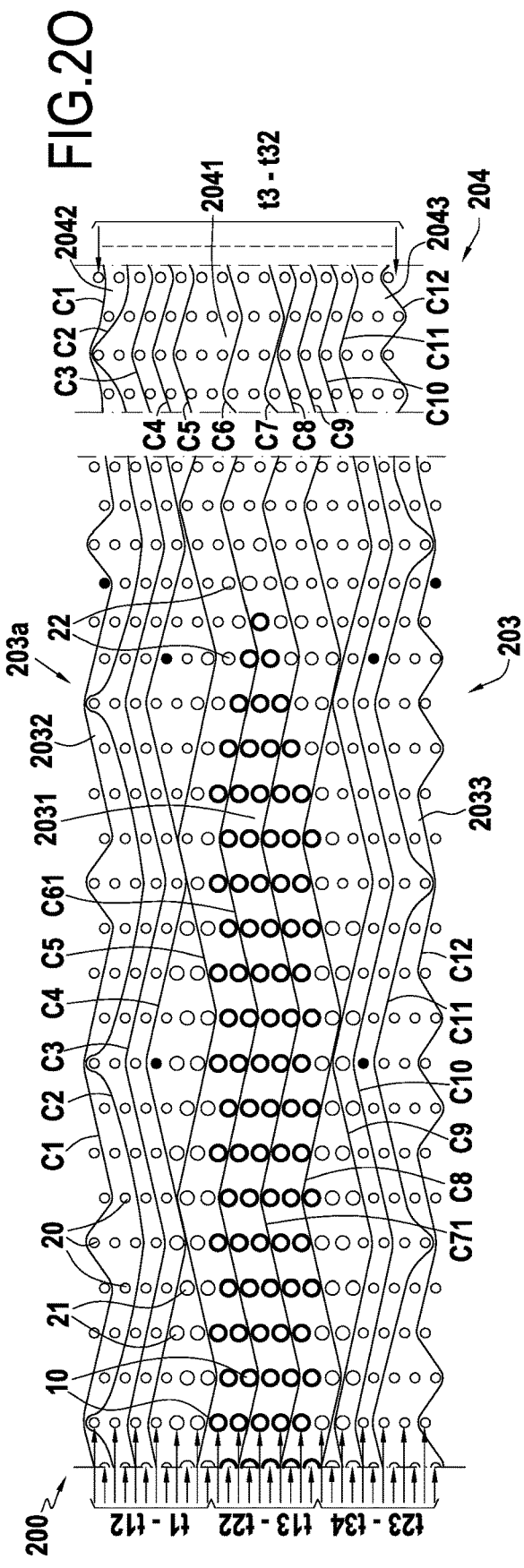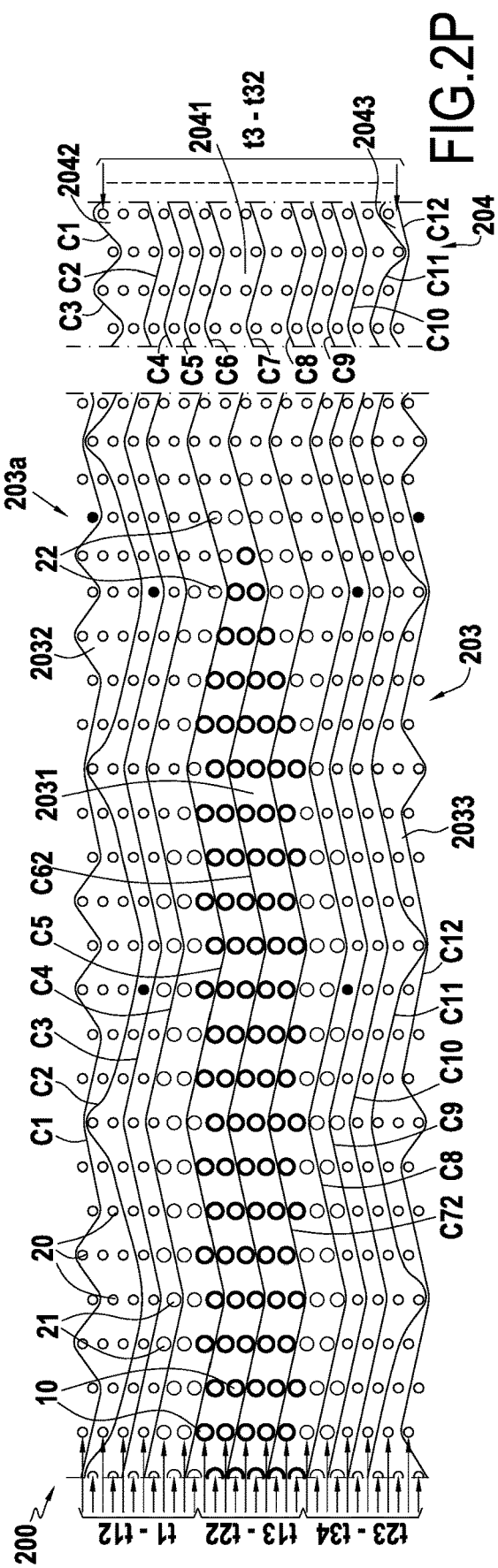

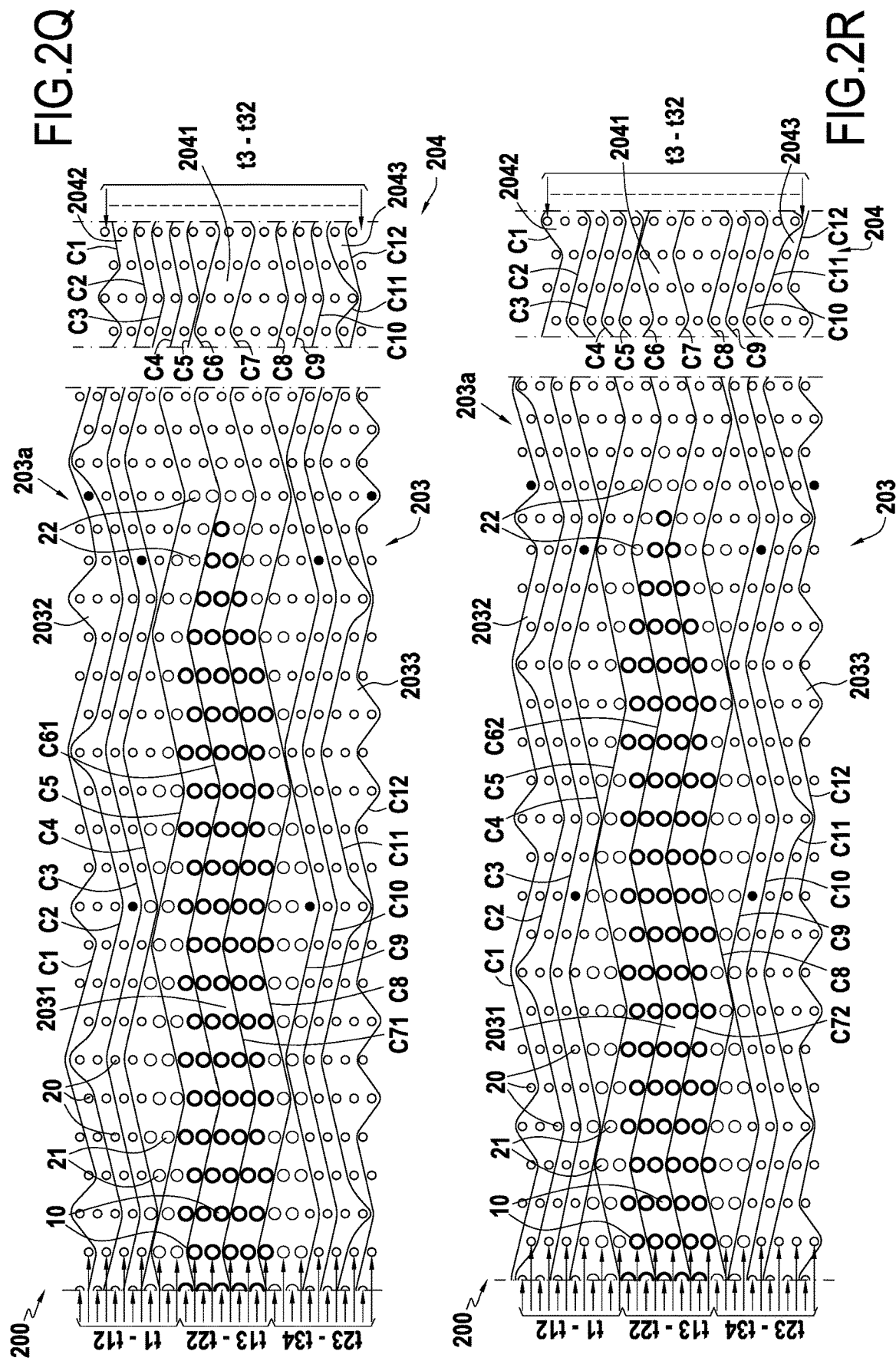

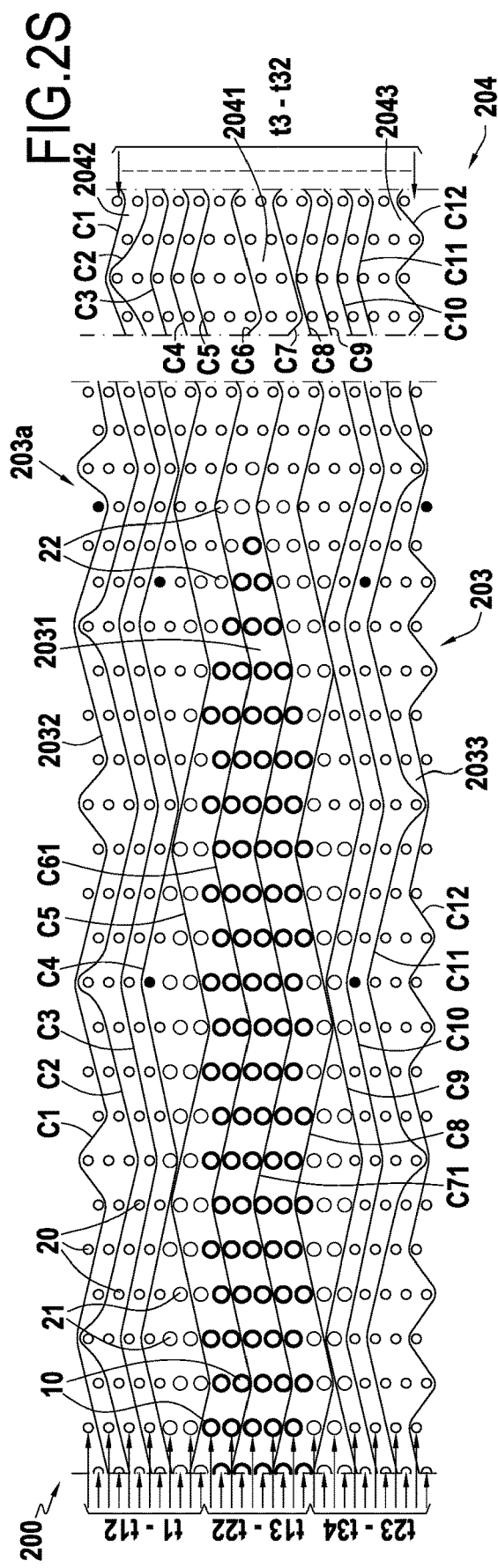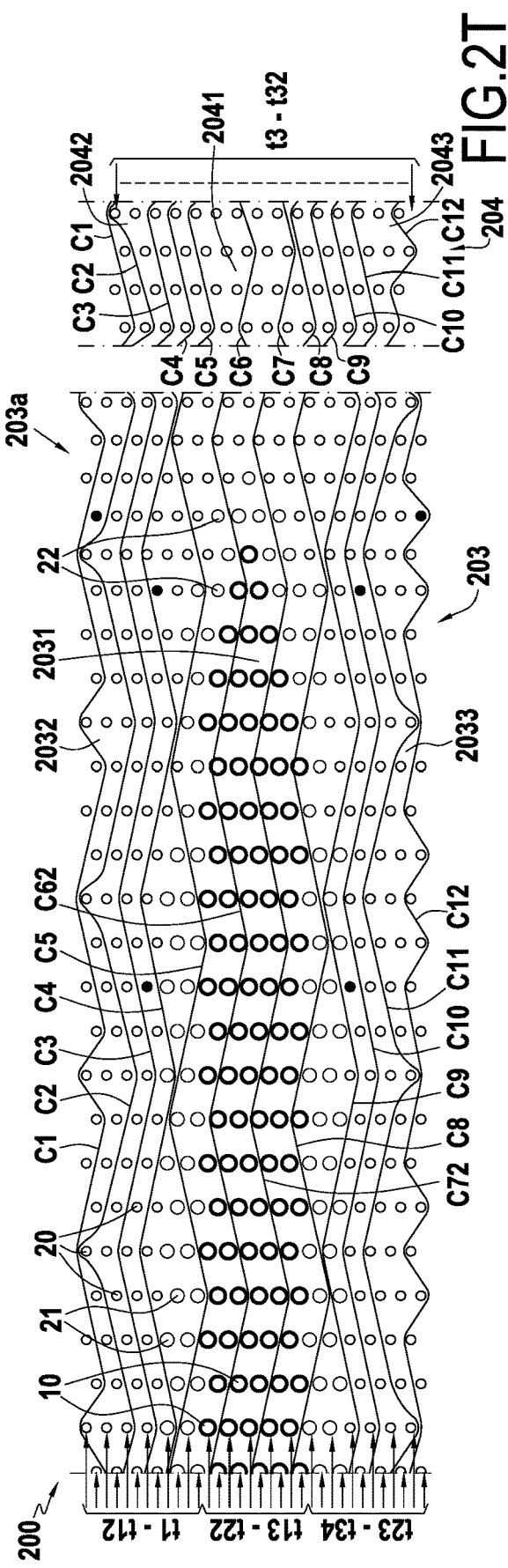

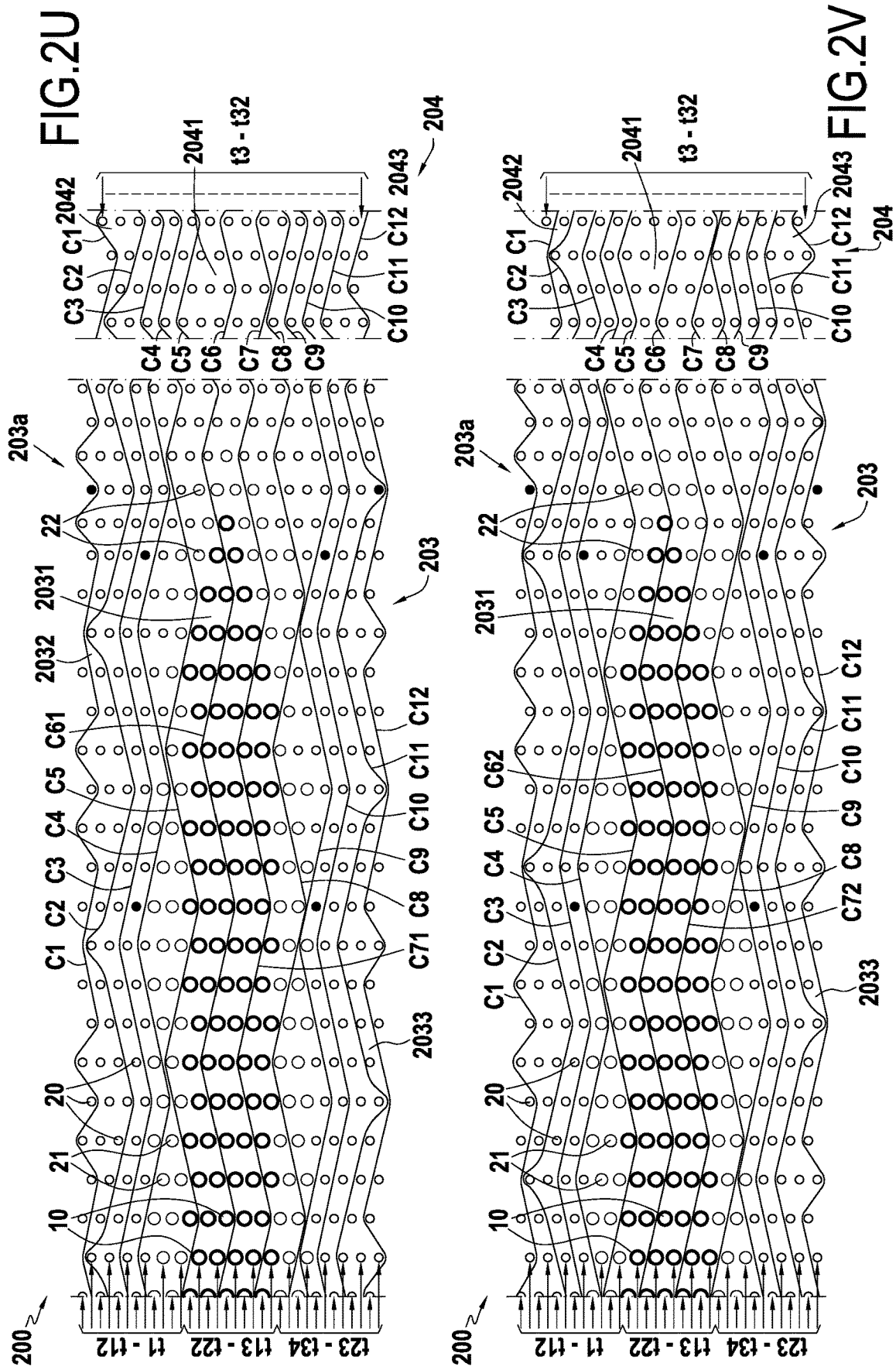

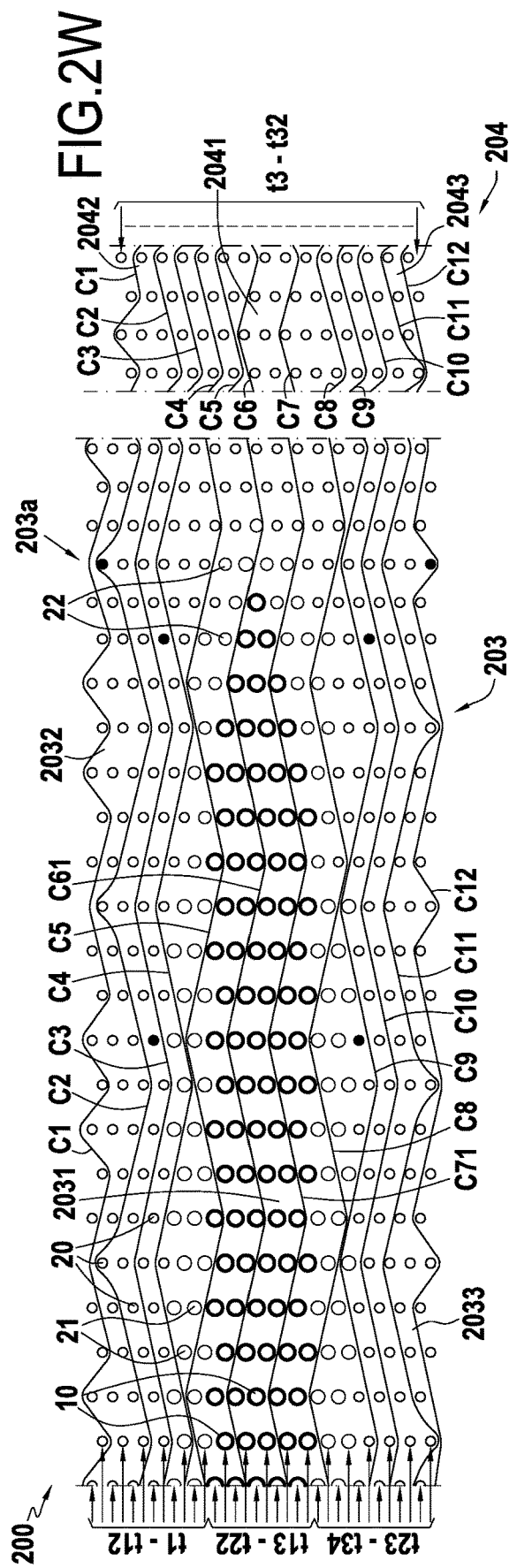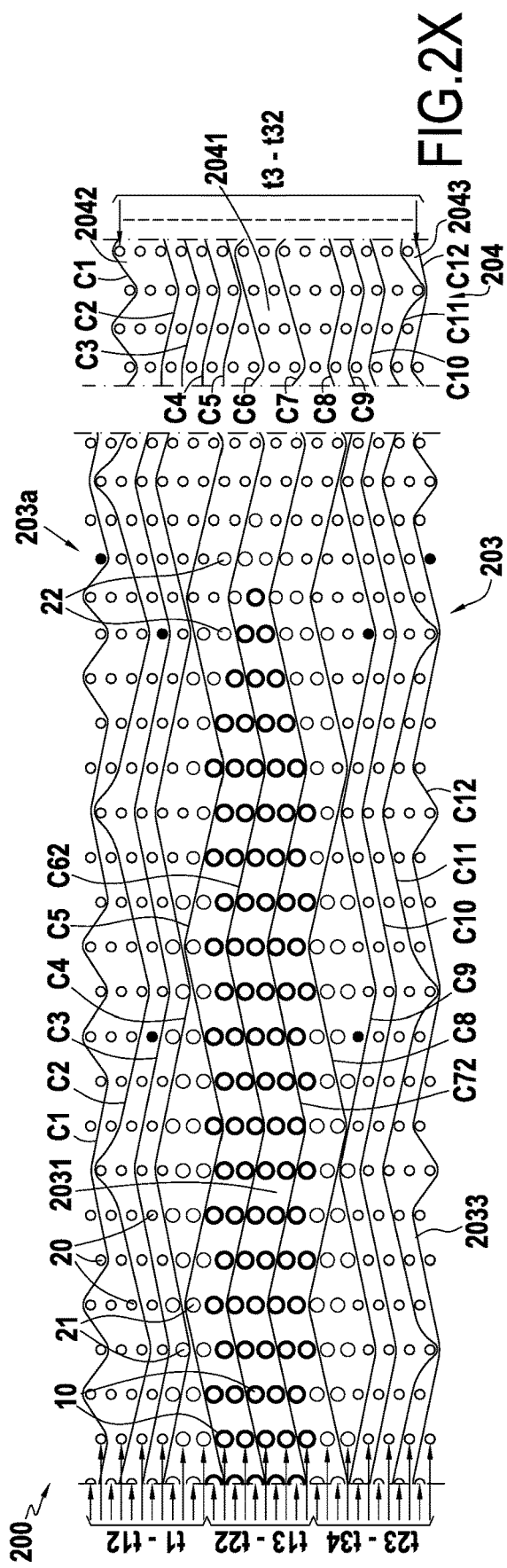

REINFORCING FIBER STRUCTURE FOR COMPOSITE MATERIAL PARTS WITH GREAT VARIATION OF THICKNESS

CROSS REFERENCE TO RELATED APPLICATIONS

This application is the U.S. National Stage of PCT/FR2016/050286 filed Feb. 9, 2016, which in turn claims priority to French Application No. 1551247, filed Feb. 16, 2015. The contents of both applications are incorporated herein by reference in their entirety.

BACKGROUND OF THE INVENTION

The present invention relates to making composite material parts, and more particularly to making reinforcing fiber structures for such parts by three-dimensional (3D) or multilayer weaving.

One field of application of the invention is making parts out of structural composite material, i.e. structural parts having fiber reinforcement densified by a matrix. Composite materials serve to make parts having overall weight that is less than that of the same parts when they are made out of metal material.

The invention relates more particularly to composite material parts that include locally one or more portions of extra thickness, such as for example the root of an aero-engine blade, which corresponds to a zone in which the composite material part is of thickness that varies considerably. For a part made of composite material that presents varying thickness, the change in thickness is controlled in the fiber structure that is to form the reinforcement of the part.

Proposals have already been made to make turbine engine blades out of composite material. Reference may be made in particular to patent application US 2011/0311368 filed jointly by Snecma and Snecma Propulsion Solide. That application describes the fabrication of a turbine engine blade out of composite material comprising fiber reinforcement densified with a matrix, the fiber blank that is to constitute the reinforcement being made by multilayer weaving and including a first portion of small thickness forming an airfoil preform and a second portion of greater thickness forming a blade root preform. Under such circumstances, the blade root preform is made by using an insert in order to form a bulb-shaped region in the portion of the blade that corresponds to its root.

Nevertheless, that technique for forming the blade root makes industrial fabrication of the blade more complex and increases the cost of fabricating it since it leads to considerable losses of material and requires difficult manipulations that slow down the rate of production. Furthermore, the insert, which is also made of composite material, needs to be densified and machined, thereby leading to additional costs and potentially to parts being rejected.

The textile of the preform is floppy by nature and interacts mechanically with the insert, which can lead in particular to shear in the textile, to rotations of the insert, to non-interlinking between the insert and the textile, etc.

Furthermore, molding and densifying the portion of the preform that is to form the blade root are found to be difficult, in particular because the tolerances on the profile of the bulb-shaped root are very small (of the order of one-tenth of a millimeter) and because the requirements in terms of mechanical properties for that portion of the blade are significant, given that the blade root concentrates most of the forces applied to the blade.

Another solution is described in particular in Documents U.S. Pat. No. 7,101,154 and US 2011/0311368 and consists in increasing the weight (and thus the cross-section) of the yarns in the portions of greater thickness in the fiber structure so as to reduce the capacity for thickness being reduced when the 3D fiber structure is shaped under compression. Nevertheless, the use of yarns of high weight locally increases the fiber fraction in the preform. If the fiber fraction is too great, the resulting network of pores may be insufficient for giving the constituents of the matrix good access to the core of the preform and consequently for obtaining a composite material that is uniform and presents good mechanical properties.

OBJECT AND SUMMARY OF THE INVENTION

It is thus desirable to have 3D or multilayer fiber structures available including portions of greater thickness that do not present the above-mentioned drawbacks.

To this end, the invention provides a fiber structure for reinforcing a part made of composite material, the fiber structure comprising a plurality of weft layers and a plurality of warp layers interlinked with three-dimensional or multilayer weaving, the fiber structure comprising at least first and second portions that are adjacent in the warp direction, the first portion presenting thickness in a direction perpendicular to the warp and weft directions that is greater than the thickness of the second portion, the structure being characterized in that the weft layers situated in the core of the first portion of the fiber structure comprise braids, and in that the weft layers extending on either side of the weft layers comprising the braids and going as far as the skin of said first portion comprise yarns or strands, the braids presenting a section greater than the section of the yarns or strands.

As explained in greater detail below, the use of braids in the core of the fiber structure makes it possible to obtain considerable variation of thickness between the first and second portions, while controlling the fiber fraction in the core of the first portion. Furthermore, because of their braided structure and their tubular shape, braids allow for very good infiltration of the constituents of the matrix into the core of the fiber structure.

The fiber structure of the invention is entirely textile (i.e. without any added insert) and its yarns are interlinked by 3D or multilayer weaving, which makes it possible to obtain a structure that cannot be delaminated.

In a first particular aspect of the invention, the first and second portions comprise the same number of warp yarns woven continuously between said first and second portions. The layers of warp yarns present in the core of the first portion are burst so as to have a greater number of layers of warp yarns in the first portion than in the second portion. The first portion comprises in its core a number of layers of warp yarns that is greater than the number of layers of warp yarns present in the core of the second portion.

By thus splitting the warp yarn layers in the core of the first portion (i.e. by varying their count), it is possible to control the fiber fraction in the core of the first portion, while maintaining a satisfactory warp/weft ratio at the skin for the entire fiber structure. By way of example, the first portion may comprise in its core a number of warp yarns that corresponds to twice the number of layers of warp yarns present in the core of the second portion.

In a second particular aspect of the structure of the invention, one or more weft layers situated in the vicinity of the weft layers comprising the braids comprise yarns or strands of weight greater than the weight of the yarns or strands of the weft layers situated in the skin of the first portion.

This makes it possible to control the fiber fraction in a portion of the structure where the thickness varies.

In a third particular aspect of the structure of the invention, at least some of the weft layers situated in the core of the first portion comprise braids or yarns or strands of section that decreases going towards the second portion.

This also makes it possible to control the fiber fraction in a portion of the structure where the thickness varies.

In a fourth particular aspect of the structure of the invention, the braids present a braiding angle of about 45°. An angle of 45° makes it possible to increase the network of macropores in the core and consequently to improve the ability of the structure to be infiltrated.

The invention also provides a part made of composite material comprising fiber reinforcement densified by a matrix, said fiber reinforcement being constituted by a fiber structure of the invention.

In particular, this part may correspond to a turbine blade, the first portion of the fiber structure constituting the blade root portion of the fiber reinforcement.

The invention also provides a method of fabricating a fiber structure by three-dimensional or multilayer weaving between a plurality of weft layers and a plurality of warp layers, the fiber structure comprising at least first and second portions that are adjacent in the warp direction, the first portion presenting thickness in a direction perpendicular to the warp and weft directions that is greater than the thickness of the second portion, the method being characterized in that braids are inserted in the weft layers situated in the core of the first portion of the fiber structure, and in that yarns or strands are used in the weft layers extending on either side of the weft layers comprising braids and going as far as the skin of said first portion, the braids presenting a section greater than the section of the yarns or strands.

In a first particular aspect of the method of the invention, the first and second portions comprise the same number of warp yarns woven continuously between said first and second portions. The layers of warp yarns present in the core of the first portion are burst so as to have a greater number of layers of warp yarns in the first portion than in the second portion. The first portion comprises in its core a number of layers of warp yarns that is greater than the number of layers of warp yarns present in the core of the second portion. By way of example, the first portion may comprise in its core a number of warp yarns that corresponds to twice the number of layers of warp yarns present in the core of the second portion.

In a second particular aspect of the method of the invention one or more weft layers situated in the vicinity of the weft layers comprising the braids comprise yarns or strands of weight greater than the weight of the yarns or strands of the weft layers situated in the skin of the first portion.

In a third particular aspect of the method of the invention, at least some of the weft layers situated in the core of the first portion comprise braids or yarns or strands of section that decreases going towards the second portion.

In a fourth particular aspect of the method of the invention, the braids present a braiding angle of about 45°.

BRIEF DESCRIPTION OF THE DRAWINGS

Other characteristics and advantages of the invention appear from the following description of particular embodiments of the invention, given as non-limiting examples, and with reference to the accompanying drawings, in which:

FIGS. 2A to 2X are weft section views on a larger scale showing in part 24 successive planes of a weave for a portion of extra thickness of the FIG. 1 fiber structure;

DETAILED DESCRIPTION OF EMBODIMENTS

Figure 1:
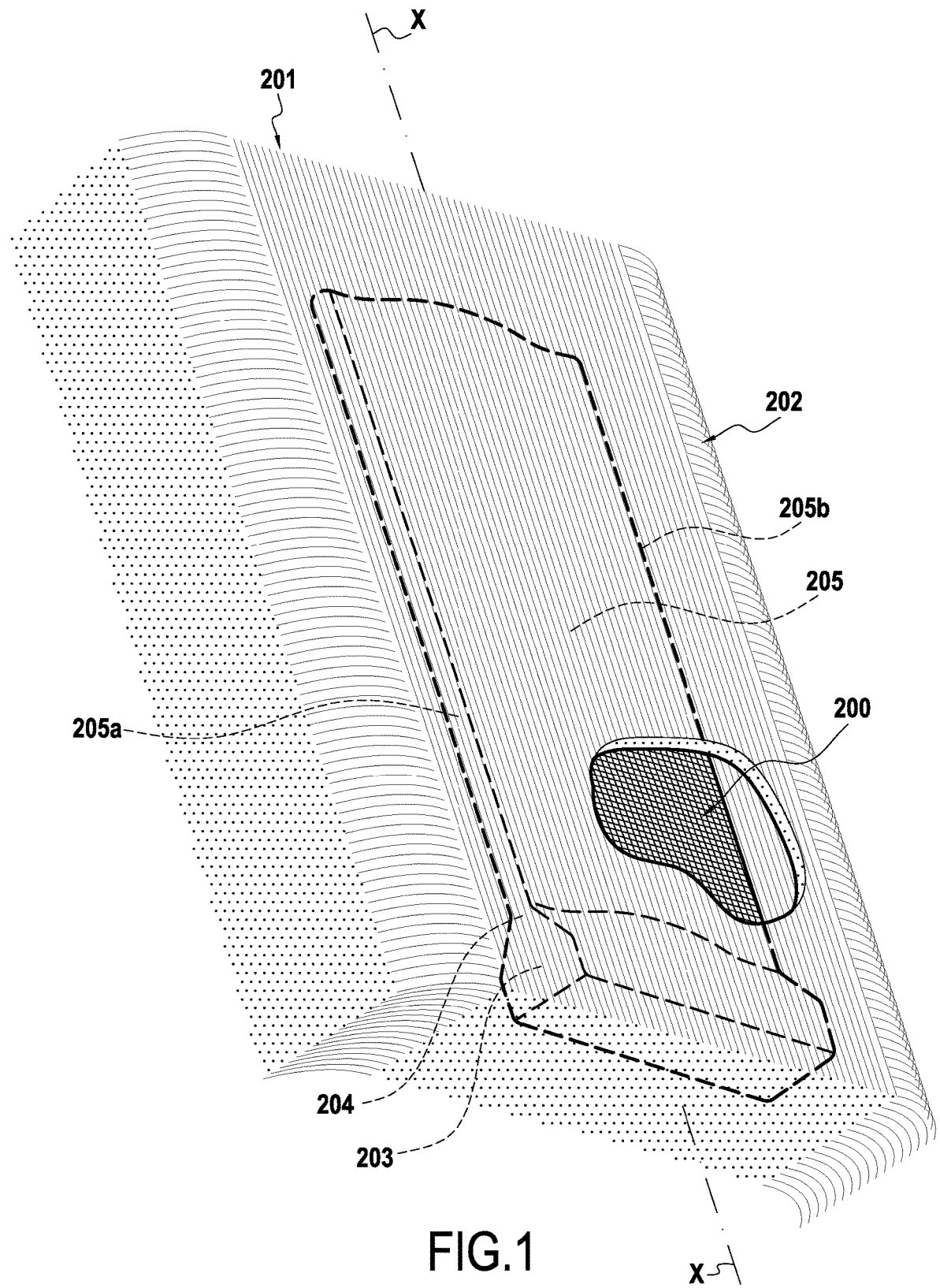
FIG. 1 is a diagrammatic view showing multilayer weaving of a fiber structure for fabricating an aeroengine blade in accordance with an implementation of the invention.

The invention applies in general manner to making fiber structures suitable for constituting fiber reinforcement or preforms for fabricating composite materials parts, and in particular aeroengine blades, the parts being obtained by densifying the fiber structures with a matrix. For composite materials used at relatively low temperatures, typically up to 300° C., the matrix is typically a resin, or else for thermostructural composite materials, it is a refractory material such as carbon or ceramic.

The fiber structure of the invention is obtained by three-dimensional weaving or by multilayer weaving.

The term "three-dimensional weaving" or "3D weaving" is used herein to mean a weaving technique in which at least some of the warp yarns interlink weft yarns over a plurality of weft layers.

The term "multilayer" weaving is used herein to designate 3D weaving in which a plurality of weft layers have a base weave in each layer that is equivalent to a conventional 2D weave, such as a plain, satin, or twill type weave, but in which certain points of the weave interlink the weft layers.

Making the layer structure by 3D or multilayer weaving makes it possible to obtain linking between the layers while performing a single textile operation, and thus to have good mechanical strength for the fiber structure and for the resulting composite material part.

It is advantageous to facilitate obtaining a surface state after densification that is free from major irregularities, i.e. a good finishing state so as to avoid or limit finishing operations by machining or so as to avoid forming pockets of resin in resin-matrix composites. For this purpose, in a fiber structure having an internal portion or core and an external portion or skin adjacent to an outside surface of the fiber structure, the skin is preferably made by weaving using a plain, satin, or twill type weave in order to limit surface irregularities, with a satin type weave additionally procuring a surface appearance that is smooth. The weave used in the skin may be varied at the outside surface of the fiber structure in order to confer desired special properties, e.g. by changing from a plain type weave that favors tight interlinking to a satin type weave that favors a smooth surface state.

In accordance with the invention, in order to form a region of great thickness in the fiber structure while controlling the fiber fraction in that region, braids are used for weaving in the core of the fiber structure. Yarns or strands of different weights between the core and the skin and/or between warp and weft may also be used to obtain a ratio within desired limits between the volume fraction of the warp fibers and the volume fraction of the weft fibers.

In order to obtain mechanical properties with as little non-uniformity as possible within a part made of composite material, it is also advantageous to favor densifying the reinforcing fiber structure with a densification gradient between the core of the fiber structure and its skin that is as small as possible, in particular when densification is performed by chemical vapor infiltration (CVI). For this purpose, in order to favor access to the core of the preform, the weaving in the core may be performed using an interlock weave, which provides easy communication between a plurality of layers of fabric.

The term "interlock weave" is used herein to mean a 3D weave in which each warp layer interlinks a plurality of weft layers, with all of the yarns of the same warp column having the same movement in the weave plane.

It is also possible to make the core and the skin by multilayer weaving using different weaves, in particular a satin type weave in the core and a plain or twill type weave in the skin.

It is also possible to vary the three-dimensional weave in the core portion, e.g. by combining different interlock weaves or by combining an interlock weave with a multilayer weave, or indeed by combining different multilayer weaves. It is also possible to vary the weave in the skin along the outside surface.

It may be desirable to vary the weight, i.e. the cross-section, of the yarns or strands used for weaving the fiber structure, in particular by using yarns or strands of weights that differ between the core and the skin and/or between the warp and the weft. A decreasing weight between the core and the skin favors access to the core for gas passing through the skin when performing CVI densification. The weights may also be selected to obtain a ratio within the desired limits between the volume fraction of warp fibers and the volume fraction of weft fibers.

It can also be desirable to use yarns of different chemical natures in different portions of the fiber structure, and in particular in the core and the skin in order to confer particular properties to the resulting composite material part, in particular properties that differ in terms of ability to withstand oxidation or wear.

Thus, for a thermostructural composite material part having refractory fiber reinforcement, it is possible to use a preform having carbon fibers in the core and ceramic fibers, e.g. silicon carbide (SiC) fibers, in the skin in order to increase the resistance to wear and to oxidation of the composite part in its skin portion.

An embodiment of a fiber structure in accordance with the invention is described below. In this embodiment, the weaving is performed on a Jacquard type loom.

FIG. 1 is a highly diagrammatic view of a fiber structure 200 that is to form the fiber reinforcement of an aeroengine blade.

The fiber structure 200 is obtained by three-dimensional (or 3D) weaving, or by multilayer weaving performed in known manner on a Jacquard type loom having a bundle of warp yarns or strands 201 arranged in a plurality of layers, the warp yarns being interlinked by weft layers 202 likewise arranged as a plurality of layers, some of the weft layers including braids, as explained in detail below. A detailed embodiment of a fiber preform that is to form the fiber reinforcement of an aeroengine blade is described in detail in particular in Documents U.S. Pat. No. 7,101,154, U.S. Pat. No. 7,241,112, and WO 2010/061140, the content of which is incorporated herein by way of reference.

The fiber structure 200 is woven as a strip extending generally in a direction X corresponding to a longitudinal direction of the blade that is to be made. The fiber structure presents varying thickness that is determined as a function of the longitudinal thickness of the profile of the airfoil of the blade that is to be made. In its portion that is to form a root preform, the fiber structure 200 presents a portion 203 of extra thickness that is determined as a function of the thickness of the root of the blade that is to be made. The fiber structure 200 is extended by a portion 204 of decreasing thickness that is to form the tang of the blade followed by a portion 205 that is to form the airfoil of the blade. The portion 205 presents a profile in a direction perpendicular to the direction X that is of thickness that varies between its edge 205a that is to form the leading edge of the blade and its edge 205b that is to form the trailing edge of the blade that is to be made.

The fiber structure 200 is woven as a single part, and after cutting away non-woven yarns, it needs to present the almost-final dimensions of the blade, i.e. its "net shape". For this purpose, in the portions of the fiber structure that are of varying thickness, as in the portion 204 of decreasing thickness, the decrease in the thickness of the preform is obtained by progressively removing weft layers during weaving.

Throughout the text below and in all of the drawings, it is stated and shown by convention and for reasons of convenience that it is the warp yarns that are deflected from their paths in order to link the yarns or braids of a weft layer or of a plurality of weft layers. Nevertheless, it is possible to invert the warp and weft roles, and that should be considered as also being covered by the claims.

FIGS. 2A to 2X show part of 24 successive planes of a weave for the portion 203 of extra thickness and for the portion 204 of decreasing thickness of the fiber structure 200 obtained by 3D weaving, the weft layers being visible in section.

In its portion 203 of extra thickness, the fiber structure 200 comprises 17 weft layers, i.e. 34 half-layers t1 to t34. In the core 2031 situated between the opposite skins 2032 and 2033, the 3D weaving is of the interlock type. In the skins 2032 and 2033, the weaving is two-dimensional with a weave of irregular satin type. The satin weave applies only to the weft half-layers t1 and t2 and to the weft half-layers t33 and t34. It should be observed that the interlock 3D weaving of the core extends to the extreme half-layers t1 and t34 of the skins in order to link these half-layers to the half-layers of the core.

In its portion 204 of decreasing thickness, the weft layers are progressively removed so as to reach a number of weft layers compatible with the portion 205 that is to form the airfoil of the blade. In the region of the portion 204 of decreasing thickness shown in FIGS. 2A to 2X, the fiber structure has 15 weft layers, i.e. 30 half-layers t3 to t32. In the core 2041 situated between the opposite skins 2042 and 2043, the 3D weaving is of the interlock type, while in the skins 2032 and 2033 the weaving is two-dimensional with a weave of irregular satin type that applies only to the weft half-layers t3 and t4 and to the weft half-layers t31 and t32.

In accordance with the invention, braids are used in the weft layers closest to the core of the portion 203 of extra thickness in the fiber structure 200. In the presently-described example, braids 10 are used in the half-layers t13 to t22. By way of example, each braid may be constituted by eight yarns each having a weight of 500 K (500 filaments), these yarns being braided around a braid core made up of two yarns arranged side by side, each likewise presenting a weight of 500 K. Under such circumstances, the diameter or section of the braid is 1.5 millimeters (mm), the braiding angle of the yarns making it possible to obtain a braid of overall section that is greater than the sum of the sections of the yarns present in the braid. The nature and/or the weight of the yarns used in the braid could be different.

Inserting braids 10 in the weft layers in the core of the fiber structure makes it possible to increase significantly the thickness of the fiber structure while controlling the mean fiber fraction in the core, which is not true when using yarns of high weight. Particularly, by using yarns of high weight in the core of the structure, it is indeed possible locally to increase the thickness of the structure, but that leads to an increase in the mean fiber fraction in the core, which is incompatible with the required mechanical properties. When the mean fiber fraction in the core is too great, it is not possible to have a network of pores that is sufficient to provide the constituents of the matrix with good access to the core of the fiber structure. The quantity of matrix present in the core is then insufficient, which means it is not possible to obtain a composite material part that presents the required mechanical properties in a manner that is uniform.

This problem is solved by using braids, which because of their large cross-section and their ability to conserve their tubular structure (the braid is not flattened while being woven in the fiber structure), serve to increase the thickness of the structure locally while limiting the increase in the mean fiber fraction. A fiber structure is thus obtained that in its portions of greater thickness provides the constituents of the matrix with very good access to the core while the structure is being densified.

As shown in FIGS. 2A to 2X, in this example, the same number of warp yarns are used in the portion 203 of greater thickness as in the portion 204 of decreasing thickness. For this purpose, the layers of warp yarns present in the core of the portion 203 of greater thickness are burst so as to have a number of warp yarn layers that is greater in the portion 203 of greater thickness than in the portion 204 of decreasing thickness. The warp yarn layers present in the core of the portion 203 of greater thickness thus present a smaller count than the layers of warp yarns present in the portion 204 of decreasing thickness. The term "count" is used herein to designate the number of yarns per unit length in the warp direction and in the weft direction.

In the presently-described embodiment, the fiber structure 200 is woven with 12 layers of warp yarns C1 to C12. Each of the layers of warp yarns C6 and C7 present in the core of the structure 200 is burst into two layers C61, C62 and into two layers C71 and C72 in the portion 203 of greater thickness. The layers C61, C62 or C71, C72 present a count that is half the count of the layer C6 or C7 present in the portion 204 of decreasing thickness. This variation of count in the layers of warp yarns present in the core between the portion 203 of greater thickness and the portion 204 of decreasing thickness makes it possible to control the core fiber fraction of the portion 203. This variation of count solely in the core of the structure also makes it possible to maintain a satisfactory warp/weft ratio, e.g. of the order of 50% in the skin of the structure. This provides good mechanical strength at the surface of the resulting part.

In order to control the mean fiber fraction between the core and the skins in the portion 203 of greater thickness, the weft layers situated in the proximity of the weft layers having braids comprise yarns or strands of weight greater than the weight of the yarns or strands in the weft layers situated in the skin of the portion 203 of greater thickness. In the presently-described example, the weft half-layers t9 to t12 and t23 to t26 present on either side of the weft half-layers t13 to t22 comprise braids 10 comprising over a determined length in the warp direction yarns 21 and 22 of weight that is greater than the weight of the yarns 20 in the half-layers t1 to t8 and t27 to t34 situated in the skin of the portion 203.

Furthermore, in order to control the fiber fraction in a zone 203a corresponding to the passage between the end of the portion 203 of greater thickness and the beginning of the portion 204 of decreasing thickness, i.e. the zone where the thickness of the fiber structure begins to diminish, the number of braids used and/or the section of the braids and/or the strands of weft layers present in the core of the fiber structure begins to be diminished. In the presently-described example, the braids 10 present in the weft half-layers t13 to t22 in the portion 203 of greater thickness are replaced progressively in the warp direction by strands or yarns 21 or 22 of weight corresponding to a section that is smaller than the section of the braids 10. The strands or yarns 21 or 22 are then replaced by yarns 20 having the same weight as the weft yarns 24 present in the portion 204 of decreasing thickness and in the skins of the fiber structure. Likewise, in the weft half-layers t9 to t12 and t23 to t26, the yarns or strands 21 are replaced progressively in the warp direction by yarns or strands 22 or by yarns 20 of smaller section.

The fiber structure of the invention may be woven, particularly, but not exclusively, using yarns made from carbon fibers, from ceramic fibers, such as silicon carbide fibers, or from oxide fibers, such as alumina fibers.

Figure 3:
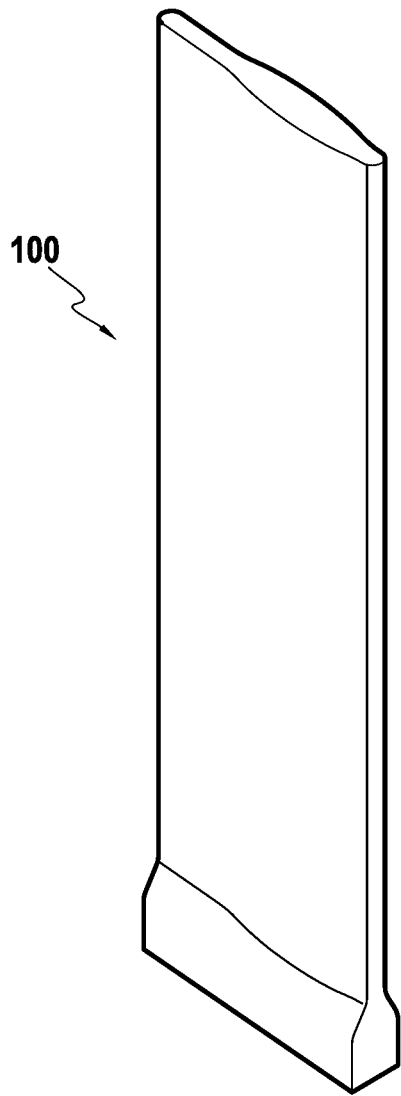
FIG. 3 is a diagrammatic perspective view of a blade fiber preform obtained from the FIG. 1 fiber structure.

Once the fiber structure 200 has been woven, the non-woven yarns are cut away. This produces the fiber preform 100 as shown in FIG. 3, which preform is woven as a single part.

Figure 4:
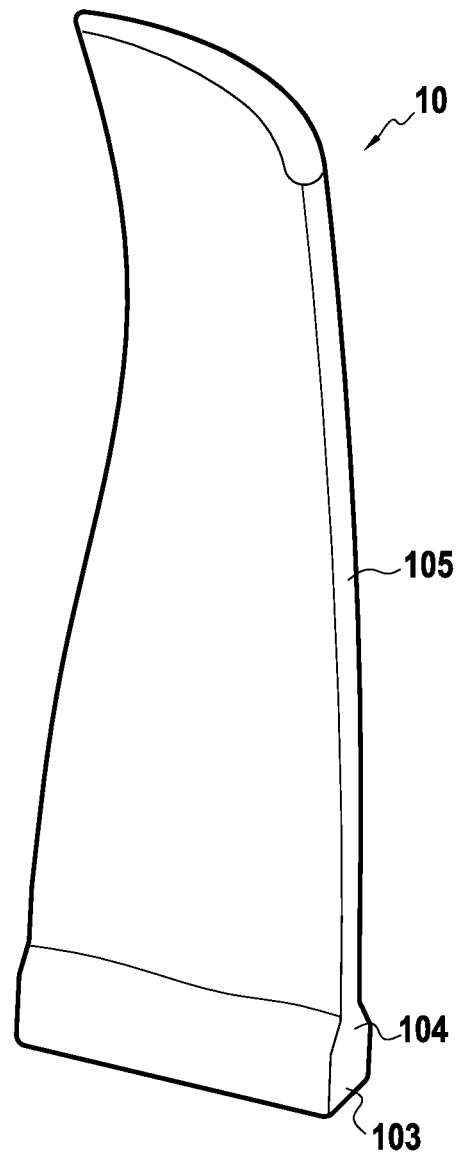
FIG. 4 is a diagrammatic perspective view of a composite material blade obtained by densifying the FIG. 4 preform with a matrix.

Thereafter, the fiber preform 100 is densified in order to form a composite material blade 10 as shown in FIG. 4. Densification of the fiber preform that is to form the fiber reinforcement of the part that is to be fabricated consists in filling in the pores of the preform throughout all or part of its volume with the material constituting the matrix. This densification may be performed in known manner using a liquid technique or a gaseous technique (CVI), or indeed by chaining those two techniques.

The liquid technique consists in impregnating the preform with a liquid composition containing a precursor for the matrix material. The precursor is usually in the form of a polymer, such as a high performance epoxy resin possibly diluted in a solvent. The preform is placed in a mold that can be closed in sealed manner to leave a cavity having the shape of the final molded blade. Thereafter, the mold is closed and the liquid precursor of the matrix (e.g. a resin) is injected throughout the cavity in order to impregnate the entire fiber portion of the preform.

The precursor is transformed into a matrix, i.e. it is polymerized, by heat treatment, generally by heating the mold, after eliminating any solvent and curing the polymer, with the preform continuing to be held inside the mold of shape that matches the shape of the part that is to be made.

When forming a matrix out of carbon or ceramic, the heat treatment consists in pyrolyzing the precursor in order to transform the matrix into a carbon or ceramic matrix depending on the precursor used and on the pyrolysis conditions. By way of example, liquid precursors for ceramics, in particular for SiC, may be resins of the polycarbosilane (PCS), or polytitanocarbosilane (PTCS), or polysilazane (PSZ) type, while liquid precursors for carbon may be resins having a relatively high coke content, such as phenolic resins. A plurality of consecutive cycles running from impregnation to heat treatment may be performed in order to achieve a desired degree of densification.

In an aspect of the invention, and in particular when forming an organic matrix, the fiber preform may be densified by the well-known resin transfer molding (RTM) method. In the RTM method, the fiber preform is placed in a mold presenting the outside shape of the part that is to be made. A thermosetting resin is injected into the inside space of the mold that contains the fiber preform. A pressure gradient is generally established in the inside space between the location where the resin is injected and orifices for discharging the resin so as to control and optimize the impregnation of the preform with the resin.

The fiber preform may also be densified in known manner using a gaseous technique by chemical vapor infiltration (CVI) of the matrix. The fiber preform corresponding to the fiber reinforcement of the blade that is to be made is placed in an oven into which a reaction gas mixture is admitted. The pressure and the temperature that exist inside the oven and the composition of the gas phase are selected so as to enable the gas phase to diffuse within the pores of the preform so as to form the matrix therein by depositing a solid material in the core of the material on coming into contact with the fibers, the solid material being the result of one of the constituents of the gas phase decomposing or of a reaction between a plurality of constituents, unlike the pressure and temperature conditions that are specific to chemical vapor deposition (CVD) methods that lead to a deposit at the surface only of the material.

An SiC matrix may be formed with methyltricholosilane (MTS) that gives SiC by the MTS decomposing, while a carbon matrix may be obtained using hydrocarbon gases such as methane and/or propane that give carbon by cracking.

It is also possible to use densification that combines both a liquid technique and a gas technique in order to facilitate working, limit costs, and limit fabrication cycles, while still obtaining characteristics that are satisfactory for the intended utilization.

The above-described densification methods make it possible starting from the fiber structure of the invention to produce mainly parts made of organic matrix composites (OMC) material, out of carbon matrix (C/C) material, and out of ceramic matrix composite (CMC) material.

When making an oxide/oxide composite material part, the fiber structure is impregnated with a slip filled with refractory oxide particles. After eliminating the liquid phase of the slip, the resulting preform is subjected to heat treatment in order to sinter the particles and obtain a refractory oxide matrix. The structure may be impregnated by methods that use a pressure gradient, such as methods of the RTM injection molding type or by sucking a submicronic powder of the "APS" type.

After densification, a composite material blade 10 is obtained that, as shown in FIG. 4, has a root 103 in its bottom portion formed by the portion 203 of greater thickness in the fiber structure 200 and extended by a tang 104 formed by the portion 204 of decreasing thickness of the structure 200, and an airfoil 105 formed by the portion 205 of the fiber structure 200.

The fiber structure and its method of fabrication of the present invention may be used in particular for making turbine engine blades that present a shape that is more complex than the blades shown in FIG. 4, such as blades that, in addition to the blades shown in FIG. 4, also include one or more platforms serving to perform functions such as sealing the gas flow passage, preventing tilting, etc.

The invention claimed is:

1. A fiber structure comprising a plurality of weft layers and a plurality of warp layers interlinked with three-dimensional or multilayer weaving, the warp layers being made of a multiple warp yarns and the weft layers being made of multiple weft yarns, the fiber structure being woven as a single part and further comprising at least first and second portions that are adjacent in, and positioned next to each other along, the warp direction, the first portion presenting thickness in a direction perpendicular to the warp and weft directions that is greater than a thickness of the second portion, wherein the weft layers situated in a core of the first portion of the fiber structure comprise a plurality of braids, wherein the weft layers extending on either side of the weft layers comprising the plurality of braids and going as far as a skin of said first portion comprise yarns, each braid of the plurality of braids presenting a diameter greater than the diameter of each of the yarns thereby making it possible to increase the thickness of the first portion relative to the second portion, wherein the first and second portions comprise the same number of warp yarns woven continuously between said first and second portions, and wherein the layers of warp yarns present in the core of the first portion are split so as to have a greater number of layers of warp yarns in the first portion than in the second portion.

2. A fiber structure according to claim 1, wherein one or more weft layers situated in the vicinity of the weft layers comprising the braids comprise yarns of weight greater than a weight of the yarns of the weft layers situated in the skin of the first portion.

3. A fiber structure according to claim 1, wherein the diameter of at least one the plurality of braids of the weft layers situated in the core of the first portion decreases going towards the second portion.

4. A fiber structure according to claim 1, wherein the braids present a braiding angle of about 45°.

5. A part made of composite material comprising fiber reinforcement densified by a matrix, said fiber reinforcement being constituted by a fiber structure according to claims 1.

6. A part according to claim 5, said part corresponding to a turbine blade, the first portion of the fiber structure constituting the blade root portion of the fiber reinforcement.

7. A method of fabricating a fiber structure by three-dimensional or multilayer weaving between a plurality of weft layers and a plurality of warp layers, the warp layers being made of a multiple warp yarns and the weft layers being made of multiple weft yarns, the fiber structure being woven as a single part and further comprising at least first and second portions that are adjacent in, and positioned next to each other along, the warp direction, the first portion presenting thickness in a direction perpendicular to the warp and weft directions that is greater than a thickness of the second portion, the method comprising inserting a plurality of braids in the weft layers situated in the core of the first portion of the fiber structure, and using yarns in the weft layers extending on either side of the weft layers comprising the plurality of braids and going as far as the skin of said first portion, each braid of the plurality of braids presenting a diameter greater than the diameter of the yarns thereby making it possible to increase the thickness of the first portion relative to the second portion, wherein the first and second portions comprise the same number of warp yarns woven continuously between said first and second portions, and wherein the layers of warp yarns present in the core of the first portion are split so as to have a greater number of layers of warp yarns in the first portion than in the second portion.

8. A method according to claim 7, wherein one or more weft layers situated in the vicinity of the weft layers comprising the braids comprise yarns of weight greater than a weight of the yarns of the weft layers situated in the skin of the first portion.

9. A method according to claim 7, wherein the diameter of at least one the plurality of braids of the weft layers situated in the core of the first portion decreases going towards the second portion.

10. A method according to claim 7, wherein the braids present a braiding angle of about 45°.

11. A fiber structure according to claim 1, wherein the braids have a tubular structure.

12. A fiber structure according to claim 1, wherein a braiding angle of yarns constituting at least one of the plurality of braids is selected such that said at least one braid has a diameter that is greater than a sum of the diameters of the yarns constituting said at least one braid.

13. A fiber structure according to claim 1, wherein a number of layers of warp yarns present in the core of the first portion is greater than a number of layers of warp yarns present in a core of the second portion.

* * * * *